(12) United States Patent
Milligan

(10) Patent No.: US 10,699,752 B2
(45) Date of Patent: Jun. 30, 2020

(54) VIBRATION ISOLATOR

(71) Applicant: Seagate Technology LLC, Cupertino, CA (US)

(72) Inventor: Gray Daniel Milligan, Golden, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/352,464

(22) Filed: Mar. 13, 2019

(65) Prior Publication Data

US 2019/0214056 A1  Jul. 11, 2019

Related U.S. Application Data

(63) Continuation of application No. 14/561,363, filed on Dec. 5, 2014, now abandoned.

(51) Int. Cl.
*H05K 5/00* (2006.01)
*G11B 33/08* (2006.01)

(52) U.S. Cl.
CPC .................................. *G11B 33/08* (2013.01)

(58) Field of Classification Search
CPC ....................................................... H05K 5/00
See application file for complete search history.

(56) References Cited

U.S. PATENT DOCUMENTS

| 5,397,206 | A | 3/1995 | Sihon |
| 5,765,819 | A | 6/1998 | Hummel |
| 5,876,023 | A | 3/1999 | Hain et al. |
| 6,227,784 | B1 | 5/2001 | Antoine et al. |
| 7,092,251 | B1* | 8/2006 | Henry ................. G11B 25/043 248/618 |
| 8,137,041 | B2 | 3/2012 | Zhou |
| 8,454,290 | B2 | 6/2013 | Schaser et al. |
| 9,309,949 | B2* | 4/2016 | Kaneko .................. F16F 1/376 |
| 2005/0073166 | A1 | 4/2005 | Snyder |
| 2006/0026771 | A1 | 2/2006 | Houser |
| 2008/0302622 | A1 | 12/2008 | Ohtake |
| 2011/0058318 | A1 | 3/2011 | Tsuchida |
| 2012/0182684 | A1 | 7/2012 | Chou |

FOREIGN PATENT DOCUMENTS

EP  1205672 A1  5/2002

* cited by examiner

*Primary Examiner* — Jerry Wu
(74) *Attorney, Agent, or Firm* — Hall Estill Attorneys at Law

(57) ABSTRACT

An enclosure may be secured to an enclosure frame by a fastener that continuously extends through a first aperture of the enclosure and a second aperture of an isolator. The isolator may contact the first aperture, enclosure frame, and fastener. The second aperture can be shaped to dampen vibration frequencies between the enclosure frame and the enclosure.

20 Claims, 6 Drawing Sheets

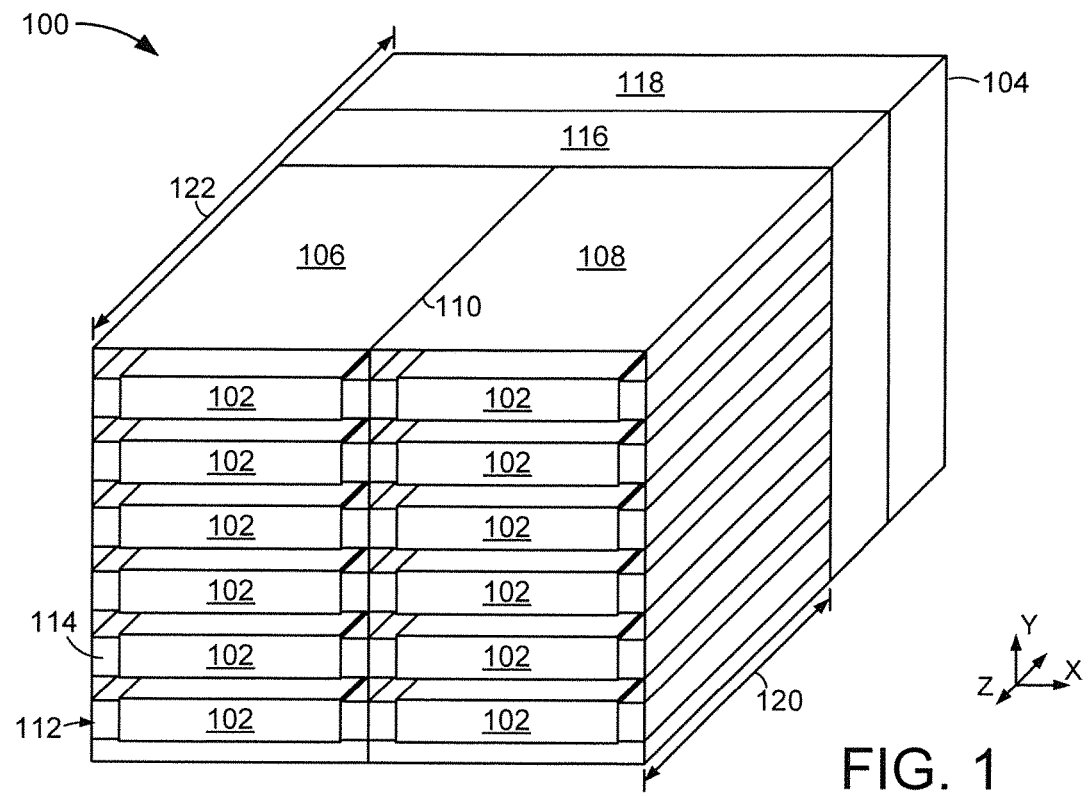
FIG. 1
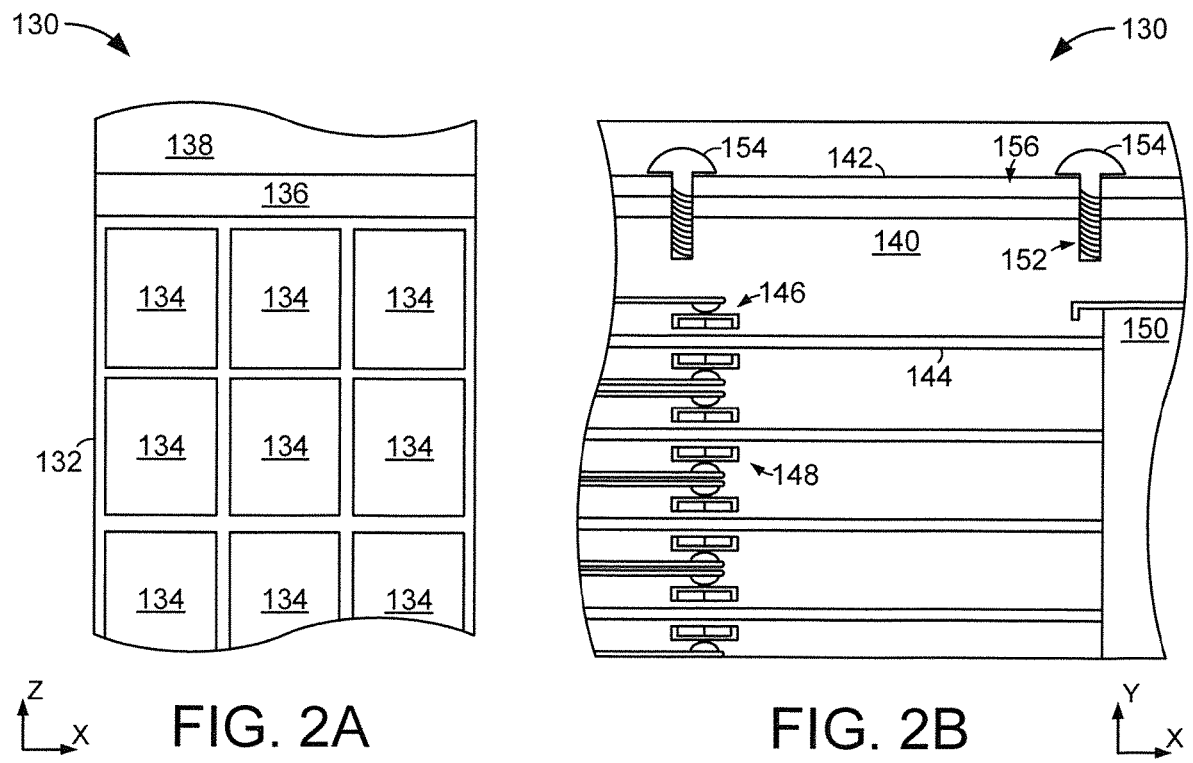
FIG. 2A
FIG. 2B

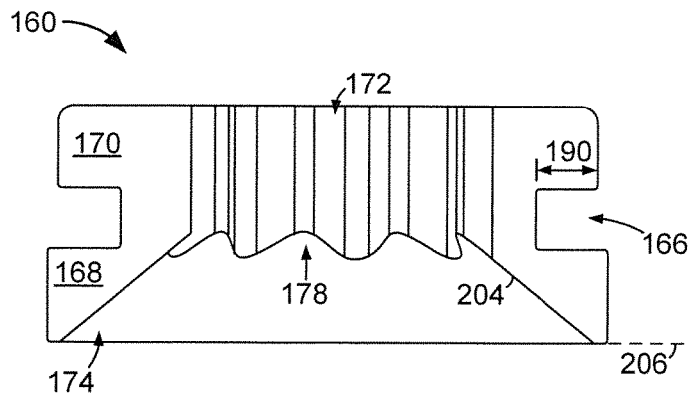
FIG. 3D
FIG. 3E
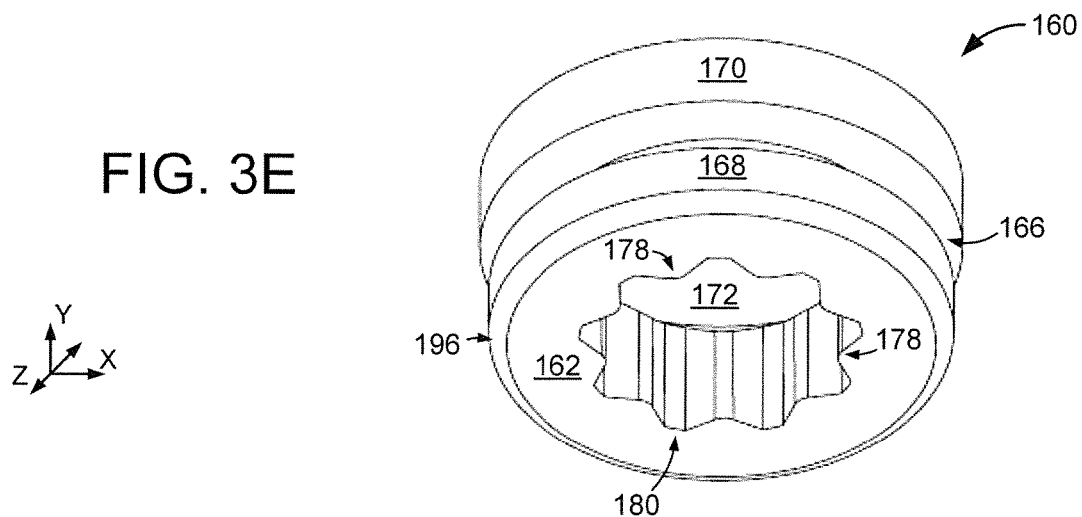
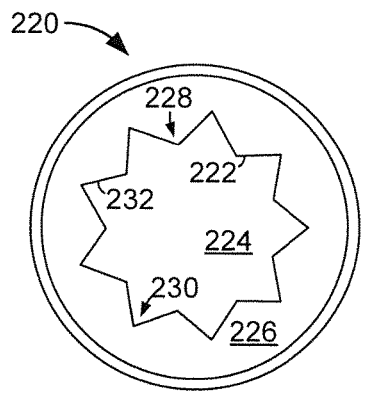
FIG. 4A
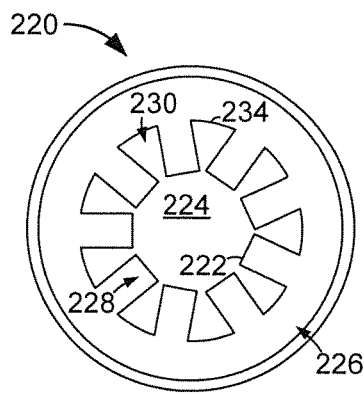
FIG. 4B
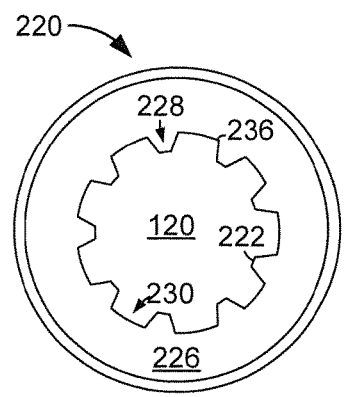
FIG. 4C

VIBRATION ISOLATOR

RELATED APPLICATION

The present application is a continuation of co-pending U.S. patent application Ser. No. 14/561,363 filed Dec. 5, 2014.

SUMMARY

Various embodiments may secure an enclosure to an enclosure frame with a fastener that continuously extends through a first aperture of the enclosure and a second aperture of an isolator. The isolator may contact the first aperture, enclosure frame, and fastener. The second aperture can be shaped to dampen vibration frequencies between the enclosure frame and the enclosure.

BRIEF DESCRIPTION OF THE DRAWINGS

FIG. 1 is an isometric block representation of an example data storage system constructed and operated in accordance with various embodiments.

FIGS. 2A and 2B respectively are block representations of portions of an example data storage system configured in accordance with some embodiments.

FIGS. 3A-3E respectively show assorted views of an example isolator that may be used utilized in the data storage system of FIG. 1 in accordance various embodiments.

FIGS. 4A-4C respectively are top view block representations of an example isolator configured in accordance with some embodiments.

DETAILED DESCRIPTION

Figure 3A:
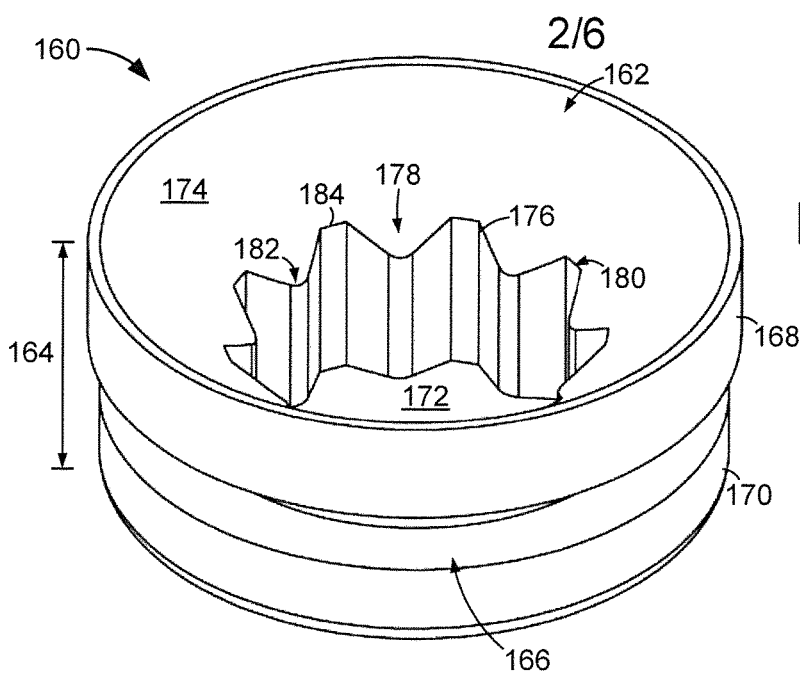

As computing devices have become more powerful, data has been generated, acquired, transferred, and stored with greater volume and speed. For example, the ability to capture, store, and stream high definition video with mobile computing devices, such as smartphones, laptop computers, tablet computers, and digital video recorders, has drastically increased the amount of data being temporarily and permanently being stored in data storage devices. Various passive and active software applications may further increase the amount of data being temporarily and permanently stored as sophisticated programs collect, analyze, and generate data, such as for security, logistics, and analytics.

Although increases in data production and consumption can provide heightened digital experiences, such elevated volumes of data can stress the performance of data storage devices and systems. For instance, a data storage device, such as a solid-state array or rotating data media, can have degraded efficiency and reliability over time when large volumes of data are read and programmed. To increase data capacity, data storage systems may incorporate a plurality of individual data storage devices into an electrically and physically interconnected array of devices that operate collectively while providing individual device accessibility that allows for array maintenance, evaluation, addition, and modification. However, vibrations occurring continuously, sporadically, or routinely in various portions of a data storage system can degrade data storage performance in physically interconnected data storage devices.

A data storage system, in accordance with various embodiments, can dampen vibration frequencies between a data storage enclosure and an enclosure component by shaping an aperture of an isolator that contacts the data storage enclosure, enclosure component, and a fastener. Tuning the shape of the isolator aperture can provide one or more protrusions that engage and secure the fastener while reducing and eliminating vibrations transmitted between the data storage enclosure and the enclosure component by deforming. The ability to tune the isolator aperture to simultaneously dampen diverse ranges of vibrations from different aspects of a data storage system can optimize data storage device performance by reducing ambient and resonant frequencies present while the data storage device operates.

It is contemplated that a data storage system can stand alone and be connected via any number of wired and wireless networks to any number of remote hosts and nodes. A data storage system may consist of at least one local or remote system processor that directs operation of at least one data storage device to store and retrieve data. Although a data storage device is not limited to any size, shape, function, format, or environment, various embodiments configure a system 100 as illustrated in FIG. 1. The system 100 has a plurality of enclosures 102 that can house one or more of electronic devices, such as data storage devices, servers, and circuits, that operate independently and concurrently. Each enclosure 102 can, in some embodiments, consist of a power source, local processor, and cooling assembly. An enclosure 102 can be configured to operate independently and concurrently with other enclosures housed in the rack 104.

The rack 104 may be arranged in any number of configurations, such as being separated into first 106 and second 108 compartments that are bifurcated by a wall 110. Each compartment 106 and 108 can be further arranged into separate trays 112 which may, or may not, correspond to the size and shape of an enclosure 102 and be aligned along a common plane, such as the X axis. Each tray 112 can be defined by, but is not limited by, a pair of rails 114 that support the enclosure 102 and allow the enclosure 102 to be installed and removed efficiently. For example, the rails 114 can be static protrusions, casters, slides, and ball bearings that retain the enclosure 102 while allowing enclosure 102 movement.

In some embodiments, the rack 104 contacts a midplane 116 that is disposed between a cooling section 118 and each compartment 106 and 108. The cooling section 118 may consist of any number of passive and active cooling components, such as fans, heat fins, and liquid pumps, which can operate to reduce, control, and maintain various temperatures for the data storage system 100. The midplane 116 can be arranged as any number, type, and size of connectors that operably interconnect the various enclosures 102. That is, the midplane 116 can be configured to physically and electrically interconnect the enclosures 102 and trays 112 to allow individual and concurrent data flow to and from the various enclosures 102. The midplane 116, in some embodiments, is configured to efficiently pass air, fluid, and cabling from the cooling section 118 to the respective compartments 106 and 108.

It is noted that, in some embodiments, the rack 104 can be configured in any variety of manners to temporarily and permanently store data. The non-limiting embodiment shown in FIG. 1 illustrates how the data storage enclosures 102 and compartments 106 and 108 can have a length 120 along the Z-axis that occupies a majority of the overall length 122 of the rack 104. However, assorted embodiments may tune the size of the enclosure length 120 to allow for a larger cooling section 118 and/or midplane 116. Regardless of the size of the enclosure length 120, the vertical stacking of multiple trays 112 and electronic devices allow for the rack 104 to have a large operating capacity, such as 1 petabyte of data storage.

FIGS. 2A and 2B respectively illustrate block representations of different portions of an example data storage system 130 configured in accordance with various embodiments. FIG. 2A is a top view of a portion of an enclosure 132 that may be utilized individually and collectively to provide a large data storage capacity. The enclosure 132 has a plurality of data storage devices 134 that may be mounted to, on, and within an enclosure frame, or common plate, to be physically separated and electrically interconnected to at least one bus 136. The various data storage devices 134 may be similar or dissimilar types, sizes, shapes, and speeds that provide a collective data access performance for the enclosure 132.

As a non-limiting example, less than all the data storage devices 134 can have different data storage capacities that are assigned to different data storage purposes, such as cache or archive storage. Other embodiments may configure the data storage devices 134 as different types of memory, such as rotating hard drives and solid-state memory arrays, that are assigned different data storage purposes in accordance with the performance of each type of memory, like long-term storage for hard drives and caching for solid-state storage. The enclosure 132 may position one or more cooling and control components, such as fans, processors, and network adaptors, in a secondary region 138 that may, or may not, be opposite the bus 136 from the data storage devices 134.

FIG. 2B is a side view block representation of a portion of the example data storage system 130 that shows how a hard disk drive enclosure component 140 can be physically mounted to an enclosure frame 142. While not limiting to how a data storage device enclosure component 140 can be arranged, the hard drive of FIG. 2B has a plurality of separate data storage media 144 that are respectively constructed to store data bits that are accessible from one or more surfaces via separate top 146 and bottom 148 data transducing assemblies. Rotation of a central spindle 150 can generate an air bearing between each data storage medium 144 and the transducing assemblies 146 and 148 that allows data access operations, such as data reading and writing, to be conducted with one or more data transducing means, such as a magnetoresistive reader and perpendicular data bit writer, in the transducing assembly 146 and 148.

It is contemplated that sporadic rotation and speed of the spindle 150 can contribute to vibration transmitted to other data storage devices 134 of the data storage enclosure 132 via rigid or flexible contact of the enclosure component 140 and the enclosure frame 142. It is further contemplated that movement, maintenance, and vibration induced upon the enclosure frame 142 may inadvertently be transmitted to one or more data storage devices 134 due to the rigid or flexible contact provided by at least one fastening means 152. Although not required or limiting, the fastening means 152 of FIG. 2B is a threaded fastener 154 that continuously extends through the enclosure frame 142 into the enclosure component 140 to secure the enclosure component 140 in direct, or spaced, relation to the enclosure frame 142. In other words, the fastening means 152 can be tuned to secure the enclosure component 140 in direct contact with the enclosure frame 142, a spaced separation distance 156 from the enclosure frame 142, or a combination of the two.

Regardless of a direct contact or spaced relationship between the enclosure frame 142 and enclosure component 140, the fastener 154 can transmit vibration to the static and dynamic aspects of the enclosure component 140 that degrade device performance. While rigid and flexible washers, spacers, isolators, and risers can be configured as part of the fastening means 152, vibrations may still be transmitted to the detriment of performance of the enclosure component 140. Hence, there is a continued interest in enclosure mounting configurations that can be tuned to specifically mitigate and eliminate the transmission of vibration between a data storage enclosure 142 and enclosure component 144, such as a hard drive.

FIGS. 3A-3E respectively display different views of an example isolator 160 that may be utilized in the data storage systems 100 and 130 in accordance with some embodiments. The isolator 160 can be configured of one or more types of materials, such as metal, plastic, ceramic, thermoset thermoplastic, and elastomeric thermoplastic, that exhibit hardness, resonant vibration frequency, and density parameters conducive to dampening the amount of vibration a data storage enclosure component experiences. Various embodiments configure the isolator 160 to surround and isolate mounting hardware, such as the fastener 154 of FIG. 2B.

As shown in the perspective view of FIG. 3A, the isolator 160 can have a body 162 that has a substantially circular shape and predetermined height 164 along the Y axis. It is noted that a circular shape is not required and other shapes, such as oval, trapezoidal, rectangular, and triangular, can be provided along the Y-X and Z-X planes, respectively and without limitation. The isolator body 162 can have a notch 166 disposed between first 168 and second 170 lateral protrusions that can be configured to contact, engage, and secure different portions of a data storage enclosure frame. The isolator body 162 may further be configured with at least one aperture 172 that is centrally positioned in a tapered surface 174 in the Z-X plane. The tapered surface 174 can be tuned to accommodate some, or all, of a fastener, such as a fastener head.

The isolator aperture 172 can be partially or completely defined by a sidewall 176 that provides a plurality of protrusions 178 each connected and separated by a recess 180. The protrusions 178 can be tuned to be similar, or dissimilar, sizes, shapes, and positions around the aperture 172 to engage a fastener and dampen vibrations of a predetermined range, such as 1-1,000 Hz. For example, one protrusion 178 may have a continuously curvilinear sidewall surface 182 along the Z-X plane while another protrusion is defined only by linear sidewalls. In the non-limiting embodiment shown in FIG. 3A, a plurality of protrusions 178 and recesses 182 are similarly constructed with curvilinear protrusion sidewall surfaces 182 and linear recess sidewall surfaces 184, which can be tuned for size, depth, and position about the aperture 172 to control the range and degree of vibration mitigation provided by the isolator 160.

Figure 3B:
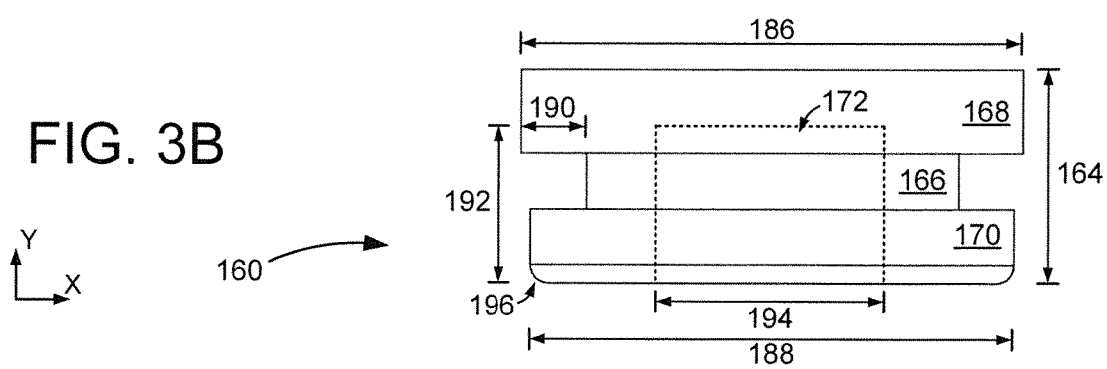

FIG. 3B illustrates a side view block representation of the isolator 160. As shown, the isolator 160 has a greater width 186 at the first protrusion 168, along the X axis, than a smaller width 188 at the second protrusion 170. The ability to tune the widths 186 and 188 of the protrusions 168 and 170 to different lengths can complement the depth 190 of the notch 166 to concurrently engage different portions and surfaces of a data storage enclosure. The tuned difference in widths 186 and 188 can aid in installation of the isolator 160 into an aperture of the data storage enclosure. The isolator 160 may also have multiple different heights 164 and 192 that respectively correspond with the overall height 164 of the isolator body 162 and the aperture 172. The different heights 164 and 192 can correspond to the shape and size of the taper surface 174 that tunes the height of the respective protrusions 178 and recesses 180.

The shape and size of the aperture 172 can further be tuned for width 194 that presents the various protrusions 178 and recesses 180 at orientations that contribute to mitigating vibrations between a contacting fastener and data storage enclosure. The second protrusion 170 may be also tuned to mitigate vibrations by shaping some or all of an outer circumference of the isolator body 162 with an edge feature 196. The edge feature 196 is shown in FIG. 3B as a continuously curvilinear surface that reduces the width 188 of the second protrusion 170, but such configuration is not required or limiting. For example, the edge feature 196 may consist of one or more linear and curvilinear surfaces that decrease the width 188 of the second protrusion 170, which can aid in mitigating movement and vibration from a contacting enclosure component and data storage enclosure frame.

Figure 3C:
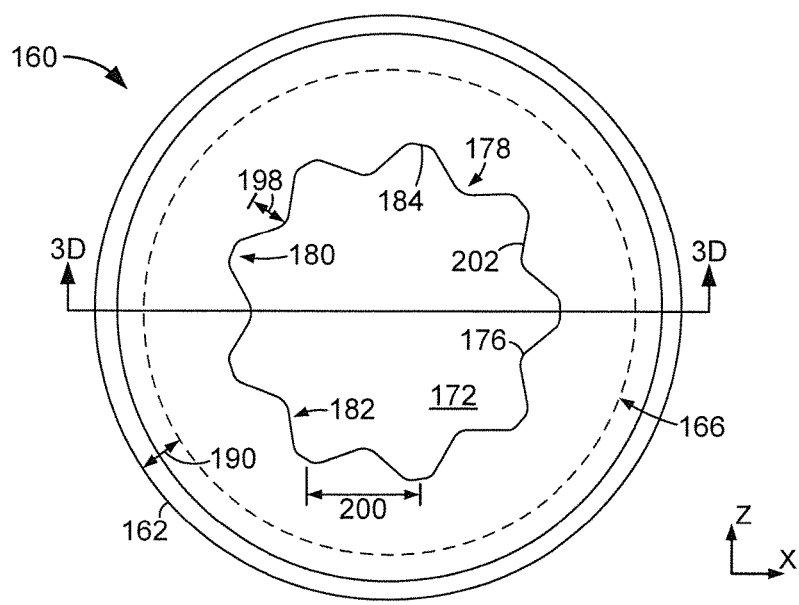

While the shape and size of the aperture 172 can vary depending on the tuned shape, size, and number of protrusions 178, FIG. 3C coveys a top view of the isolator 160 and illustrates how the aperture 172 can be circumferentially surrounded by the sidewall 176. In some embodiments, the aperture sidewall 176 is tuned to be asymmetrical radially or along a plane extending through the center of the aperture 172. Other embodiments, such as the embodiment shown in FIG. 3C, the aperture sidewall 176 is tuned to be radially symmetric about the center of the aperture 172 in the Z-X plane, which can provide uniform pressure and surface area contact to a fastener extending through the aperture 172.

The various protrusions 178 and recesses 180 can individually be configured with depths 198 and widths 200 that are similar or dissimilar, which can correspond with either an asymmetric or symmetric sidewall 176 configuration. The top view of FIG. 3C displays how, in some embodiments, each protrusion 178 and recess 180 are similarly tuned with a curvilinear protrusion tip facing a centerpoint of the aperture 172 and a linear recess sidewall 184 connected to the protrusion tips via linear connecting surfaces 202. It can be ascertained that nine protrusions 178 and recesses 180 are defined by the aperture sidewall 176; however, any number of protrusions 178 and recesses 180 can be constructed, without limitation.

Through the tuning of the depth 198, width 200, number, and orientation of the various protrusions 178 and recesses 180, how the isolator 160 contacts a fastener is tuned. The ability to tune the amount and manner of surface area contact between the isolator body 162 and a fastener extending through the aperture 172 can be controlled. As a non-limiting example, the aperture sidewall 176 configuration shown in FIGS. 3A-3E can securely contact a fastener with the protrusions 178 while the recesses 180 allow the protrusions 178 to adjust radially and laterally, which can dampen vibration at specific and general vibration ranges.

Turning to FIG. 3D, a cross-section of the isolator 160 illustrates how the notch 166 can have a depth 190 that extends into the isolator body 162 without extending into the aperture 172. The taper surface 174 is shown shaped with a linear taper sidewall 204 that circumferentially extends around the aperture 172. The linear taper sidewall 204 can be tuned for shape and size to accommodate some, or all of a fastener head. For instance, the linear sidewall 204 of FIG. 3D can provide a countersink region that matches the exterior profile of a fastener and allows the fastener to nest within the isolator body 162. In some embodiments, the taper sidewall 204 is configured so that no part of the fastener extends beyond the height of the first protrusion 168, which corresponds with plane 206.

FIG. 3E is a perspective view of a portion of the isolator 160 that shows how the various protrusions 178 and recesses 180 each have a uniform shape and size throughout the height of the aperture 172, along the Y-X plane. The orientation of the isolator 160 in FIG. 3E illustrates how the edge feature 196 continuously and uniformly extends about the outer periphery of the first protrusion 168. It is noted that the first 168 and second 170 protrusions may have similar or dissimilar edge features 196. In the non-limiting embodiment of FIG. 3E, the first protrusion 168 has a curvilinear edge feature 196 and the second protrusion 170 has a rectangular outer edge, which can increase the efficiency of installation, maintenance, and removal of the isolator 160

It is to be understood that the aperture sidewall 176 configuration shown in FIGS. 3A-3E is not required. FIGS. 4A-4C respectively display top view block representations of an example isolator 220 constructed with different aperture sidewall 222 configurations. FIG. 4A conveys a fastener aperture 224 extending through a isolator body 226 with the aperture sidewall 222 providing a number of protrusions 228 and recesses 230 with linear sidewall surfaces 232. That is, the aperture sidewall 222 is tuned with continuously linear surfaces 232 that interconnect at points that collectively create a star shaped pattern. The protrusion points provided by the linear sidewall surfaces 232 can engage and secure a fastener differently than the curvilinear protrusion surfaces 182 shown in FIG. 3A to dampen vibrations differently, such as different vibration frequencies and different vibration mitigation amounts.

FIG. 4B displays how the aperture sidewall 222 can be tuned to shape the protrusions 228 substantially as rectangles that are interconnected by continuously curvilinear recess sidewall surfaces 234. The combination of rectilinear protrusions 228 and curvilinear recesses 230 can tune the manner in which the protrusions 228 tilt and translate in response to a fastener extending through the aperture 224. The increased protrusion 228 surface area provided by the rectilinear protrusions 228 of FIG. 4B may mitigate vibration differently than the pointed protrusion tips provided by the protrusions of FIG. 4A. It is contemplated that configuring the protrusion 228 shape and size to have a greater surface area than the recesses 230 can allow for increased protrusion 228 movement in response to a fastener, which can mitigate low vibration frequencies.

FIG. 4C displays how the aperture sidewall 222 can be configured to provide protrusions 228 shaped as trapezoids that have a smaller surface area than the continuously curvilinear recess sidewall surfaces 236. The smaller protrusion surface area compared to the recess surface area can increase the rigidity of the protrusions 228 and mitigate higher vibration frequencies than protrusions 228 with greater flexibility. With the ability to tune the shape and size of the protrusions 228 and recesses 230, the engagement of a fastener and mitigation of vibrations can be controlled and optimized to increase the reliability and performance of a data storage enclosure and system.

Figure 5A:
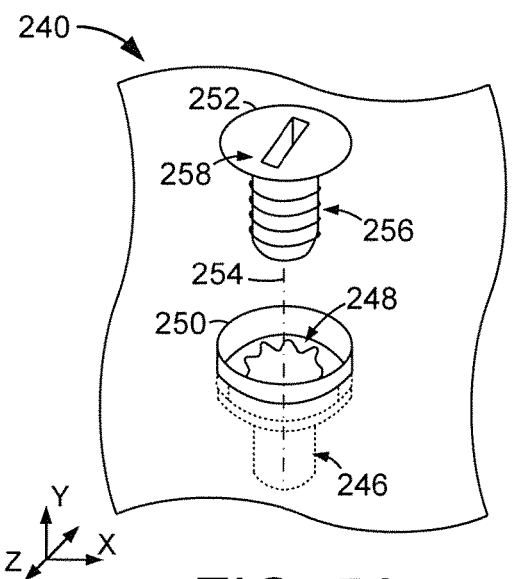
FIGS. 5A-5D respectively show assorted views of an example fastening means portion of a data storage system configured in accordance with various embodiments.

FIGS. 5A-5D respectively display block representations of an example fastening means 240 that can be incorporated into a data storage system in accordance with some embodiments. The fastening means 240 can be configured to physically interconnect a data storage enclosure component 242 with an enclosure frame 244, which are not shown in FIG. 5A, but represented via the segmented lines conveying portions hidden from direct view. In FIG. 5A, an enclosure aperture 246 is aligned with an aperture 248 of an isolator 250 and a longitudinal axis of a fastener 252 along an engagement axis 254.

Although not required or limiting, the fastener 252 can have a threaded portion 256 extending from a head 258. The fastener head 258 can have an increased surface area and volume, compared to the threaded portion, to allow for efficient installation and removal from the isolator aperture 248. The size and shape of the fastener 252 can correspond with a tuned aperture sidewall that contacts and secures the fastener 252 while dampening vibrations through aperture protrusion movement.

Figure 5B:
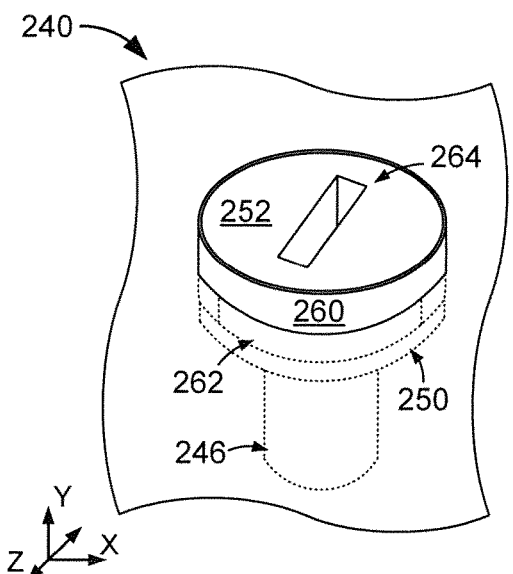

FIG. 5B illustrates how the fastener 252 can nest within isolator 250 and contact a first protrusion 260 while the threaded portion 256 engages and secures the enclosure component aperture 246. A notch 262 of the isolator 250 can contact the data storage frame and securely position the isolator aperture 248 in alignment with the enclosure component aperture 246, which allows the fastener to efficiently be installed and removed via manipulation of a fastener articulation feature 264. The cross section view of the fastening means 240 shown in FIG. 5C conveys how the second protrusion 266 of the isolator 250 can concurrently engage multiple different surfaces of the data storage enclosure frame 244 in cooperation with the notch 262 to position the isolator aperture 248 in contact and alignment with the component aperture 246.

Figure 5C:
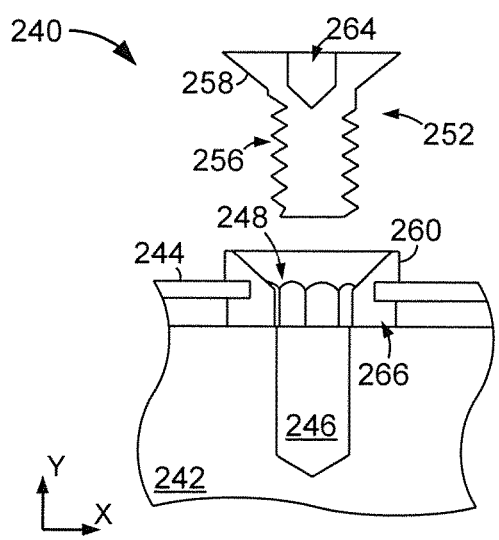
Figure 5D:
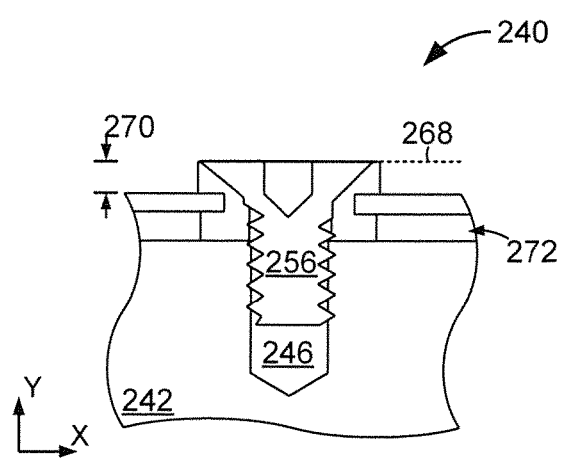

FIG. 5D shows how the fastener 252 can engage the isolator aperture 248 and component aperture 246 with the threaded portion 256. In some embodiments, the threaded portion 256 is configured to engage only the component aperture 246 and a non-threaded portion of the fastener 252, such as a smooth surface, can contact the isolator aperture 248. The isolator 250 can be configured, as shown, to nest the head 258 of the fastener 252 so that no portion of the fastener 252 extends above the top of the isolator 250, as illustrated by plane 268. The ability to nest the fastener 252 within the isolator 250 provides a low clearance height 270 compared to fastening means, such as washers and spacers, which expose portions of the fastener 252 above the clearance height 270. It is contemplated that the isolator 250 and aperture 248 can be configured to be smaller than the size of the fastener 252 so that the fastener expands at least the aperture 248 while engaging the enclosure component 242.

Figure 6:
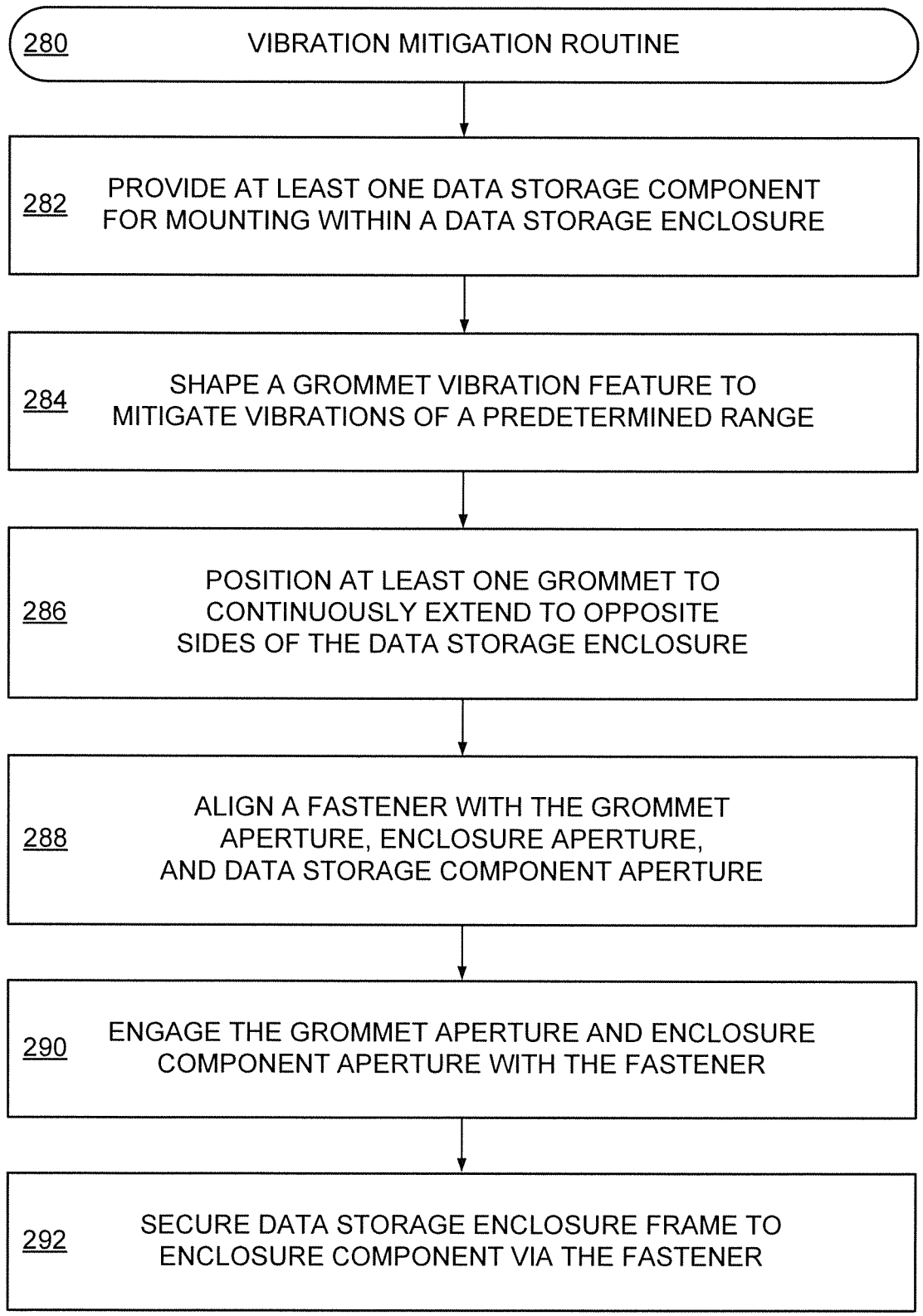
FIG. 6 provides a flowchart of an example vibration mitigation routine that may be carried out in accordance with some embodiments.

Although an enclosure component 242 and enclosure frame 244 can be physically connected in an unlimited variety of manners, such as with a separation gap 272 of predetermined distance, various embodiments interconnect an enclosure frame and component via the vibration mitigation routine 280 of FIG. 6. Initially, step 282 can provide at least one data storage component, such as a hard drive, to be mounted within a data storage enclosure. It should be noted that step 282 can be conducted for a plurality of data storage components individually and collectively before step 284 shapes a isolator vibration feature to mitigate vibrations of a predetermined range between the data storage component and the enclosure.

Step 284 may be conducted, in various embodiments, prior to step 282, which can allow a multitude of isolators to be tuned with shaped isolator apertures prior to the data storage components being ready for mounting on or within the data storage enclosure. With the tuned isolators and data storage components available, step 286 can position at least one isolator in alignment with an aperture of the data storage enclosure. Step 286 may further consist of securing the isolator to the data storage enclosure by engaging a notch of the isolator with the circumference of the enclosure aperture, which can result in the isolator contacting multiple different surfaces of the data storage enclosure, as shown in FIGS. 5C and 5D.

Next, step 288 can align a fastener with the shaped isolator aperture and an aperture of the enclosure component before step 290 engages the isolator and enclosure component with the fastener. Step 292 proceeds to secure the enclosure component to the enclosure frame. Securement in step 292 can consist of the isolator concurrently contacting the enclosure frame, fastener, and enclosure component to position the enclosure component a predetermined separation distance from the enclosure frame. That is, the isolator may secure the enclosure frame to the enclosure component without the two items in direct contact, which allows the isolator and shaped isolator aperture to mitigate vibrations between the two items.

It is contemplated that routine 280 can be conducted without step 288 and specifically without a fastener extending through the grommet. For example, the grommet can secure the data storage enclosure frame to the component via gravity and other fastening means that do not extend through the grommet. In another non-limiting example, fastening means can be positioned adjacent the grommet without extending through the grommet, which can allow the grommet to mitigate unwanted vibrations in the data storage enclosure component.

Figure 7:
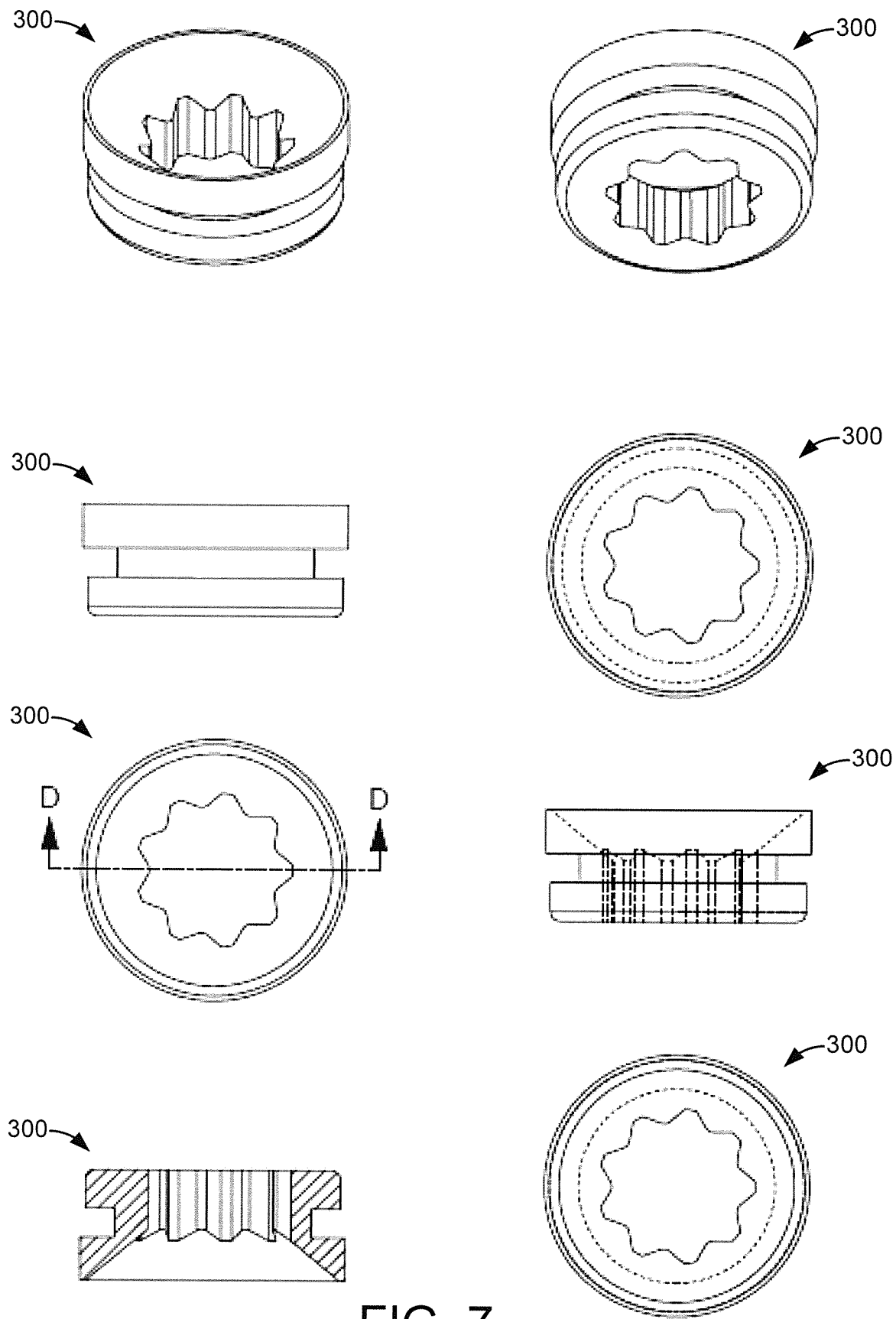
FIG. 7 conveys various views of an example isolator arranged in accordance with assorted embodiments.

FIG. 7 depicts a variety of different views of an example isolator 300 configured in accordance with various embodiments. The different views of FIG. 7 illustrate how the isolator aperture can be tuned for shape, size, and orientation to dampen vibrations between a data storage device and an enclosure frame. It is noted that no aspect of the isolator 300 is required or limiting, but provides a non-circular central aperture that can engage a fastener and mitigate the passage of vibrations to the fastener.

Through the tuning of an isolator, vibrations between a data storage enclosure and a constituent data storage device can be mitigated and eliminated. The ability to tune the shape, size, and orientation of various protrusions and recesses of an isolator aperture allows different vibration frequencies to be mitigated at a different degree than other vibration frequencies. That is, the tuned isolator can generally reduce movement and vibrations from being transmitted between an enclosure and a constituent data storage device while mitigating specific vibration frequencies to a greater degree. Such tuned configurations can optimize data storage device performance, particularly in data storage systems that physically interconnect numerous data storage enclosures and devices to provide large data storage capacities.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising an isolator having a central aperture defined by a curvilinear sidewall shaped to provide a plurality of rectangular shaped protrusions and a plurality of recesses, a fastener extending through the central aperture and fastening to a data storage enclosure, each recess of the plurality of recesses positioned between protrusions of the plurality of rectangular shaped protrusions, the plurality of recesses and the plurality of rectangular shaped protrusions respectively surrounding the fastener to dampen vibrations specific to the data storage enclosure.

2. The apparatus of claim 1, wherein the data storage enclosure houses a plurality of separate data storage devices.

3. The apparatus of claim 1, wherein the isolator positions the data storage enclosure a predetermined distance from a frame.

4. The apparatus of claim 1, wherein the data storage enclosure is positioned in a notch of the isolator.

5. The apparatus of claim 1, wherein each of the rectangular shaped protrusions of the plurality of rectangular shaped protrusions are defined by linear sidewall surfaces.

6. The apparatus of claim 1, wherein each of the recesses of the plurality of recesses are defined by linear sidewall surfaces.

7. The apparatus of claim 1, wherein each of the rectangular shaped protrusions of the plurality of rectangular shaped protrusions are defined by curvilinear sidewall surfaces.

8. The apparatus of claim 1, wherein each of the recesses of the plurality of recesses are defined by curvilinear sidewall surfaces.

9. The apparatus of claim 1, wherein the plurality of rectangular shaped protrusions are radially symmetric about a center of the aperture.

10. The apparatus of claim 1, wherein the plurality of rectangular shaped protrusions are radially asymmetric about a center of the aperture.

11. An apparatus comprising:
an isolator attached to a data storage enclosure component, the isolator having a central aperture defined by a curvilinear sidewall shaped to provide a plurality of rectangular shaped protrusions and a plurality of recesses, each recess of the plurality of recesses positioned between protrusions of the plurality of rectangular shaped protrusions; and
a fastener continuously extending through the central aperture and fastening to a data enclosure frame, the plurality of recesses and the plurality of rectangular shaped protrusions respectively surrounding the fastener to dampen vibrations specific to the data storage enclosure frame.

12. The apparatus of claim 11, wherein the data storage enclosure frame contains at least one data storage device comprising a transducing assembly positioned proximal a rotating data storage medium.

13. The apparatus of claim 11, wherein the enclosure component comprises a power source, local processor, and cooling assembly.

14. The apparatus of claim 11, wherein a first lateral protrusion of the isolator contacts a top surface of the data storage enclosure component and a second lateral protrusion of the isolator contacts a bottom surface of the data storage enclosure.

15. The apparatus of claim 11, wherein the isolator comprises tapered surface contacting a head of the fastener.

16. The apparatus of claim 15, wherein the head is positioned in the isolator so that no portion of the fastener extends above a top plane of the isolator.

17. The apparatus of claim 11, wherein each rectangular shaped protrusion of the plurality of p rectangular shaped protrusions contact the fastener.

18. The apparatus of claim 11, wherein the plurality of rectangular shaped protrusions has a greater surface area than the plurality of recesses.

19. A method comprising:
attaching an isolator to a data storage enclosure component, the isolator having a central aperture defined by a curvilinear sidewall shaped to provide a plurality of rectangle shaped protrusions and a plurality of recesses, each recess of the plurality of recesses positioned between rectangle shaped protrusions of the plurality of rectangle shaped protrusions;
aligning a frame aperture of a data storage enclosure frame with the central aperture;
connecting the data storage component to the data storage enclosure frame with a fastener that continuously extends through the central aperture into the frame aperture to fasten the data storage component to the data storage enclosure frame; and
damping vibrations generated by a data storage device contained within the data storage enclosure frame with the plurality of recesses and the plurality of rectangle shaped protrusions, the plurality of recesses and the plurality of rectangle shaped protrusions respectively surrounding the fastener to dampen a range of vibrations specific to operation of a data storage device.

20. The method of claim 19, wherein the range of vibrations are equal to or between 1 Hz and 1,000 Hz.

* * * * *